United States Patent [19]

Arnaboldi

[11] 3,948,418

[45] Apr. 6, 1976

[54] DISPENSER, NOTABLY FOR CONTAINERS

[76] Inventor: Cesare Arnaboldi, 188, Boulevard Voltaire, 75011 Paris, France

[22] Filed: Aug. 13, 1974

[21] Appl. No.: 497,103

[52] U.S. Cl. .............................. 221/251; 221/298
[51] Int. Cl.² ........................................ B65G 59/06
[58] Field of Search ........... 221/221, 223, 224, 236, 221/238, 251, 258, 267, 289, 290, 292, 293, 297, 298, 303, 307, 310

[56] References Cited
UNITED STATES PATENTS

| 1,289,907 | 12/1918 | Proper | 221/297 |
| 1,761,009 | 6/1930 | Vries | 221/223 |
| 2,816,719 | 12/1957 | Richert | 221/298 X |
| 3,664,521 | 5/1972 | Feher | 221/298 X |
| 3,790,023 | 2/1974 | Filipowicz | 221/310 X |

Primary Examiner—Drayton E. Hoffman
Assistant Examiner—Joseph J. Rolla
Attorney, Agent, or Firm—Ulle C. Linton

[57] ABSTRACT

This apparatus for dispensing under manual or automatic control action one or a plurality of articles, preferably containers such as tumblers, from a vertical tubular magazine in which the articles are stacked vertically so that each article is adapted to be released by gravity from the bottom of the stack, comprises a pair of clamps associated with a pivoting control member for engaging from underneath a peripheral projecting edge portion of each article. Another pair of clamping members may be provided if desired, for holding the stack of articles while exerting with the first pair of clamps a downward thrust, in case the articles tended to stick to one another.

3 Claims, 4 Drawing Figures

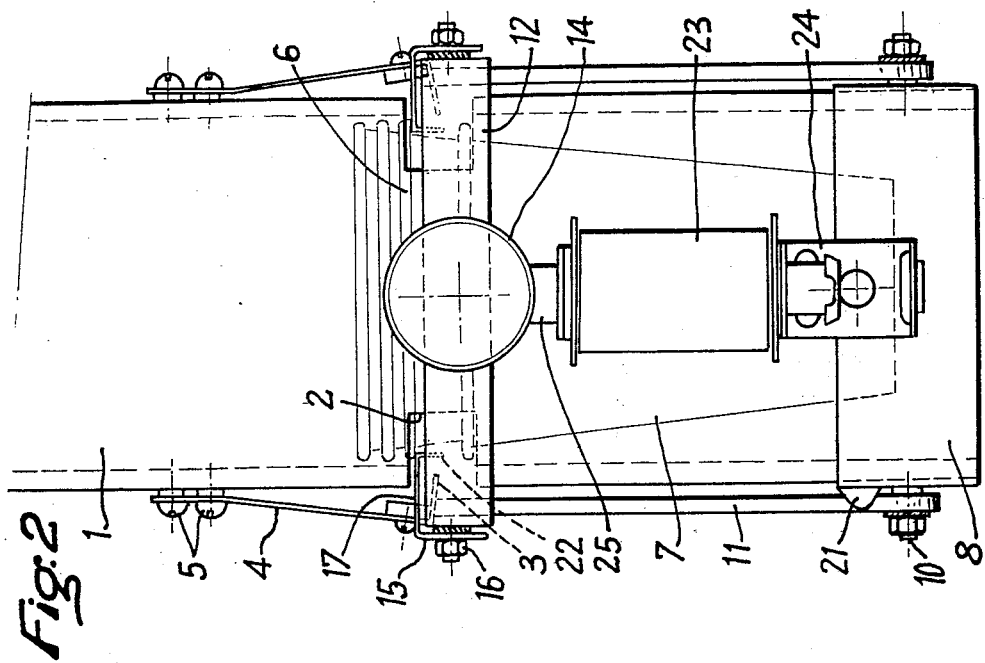
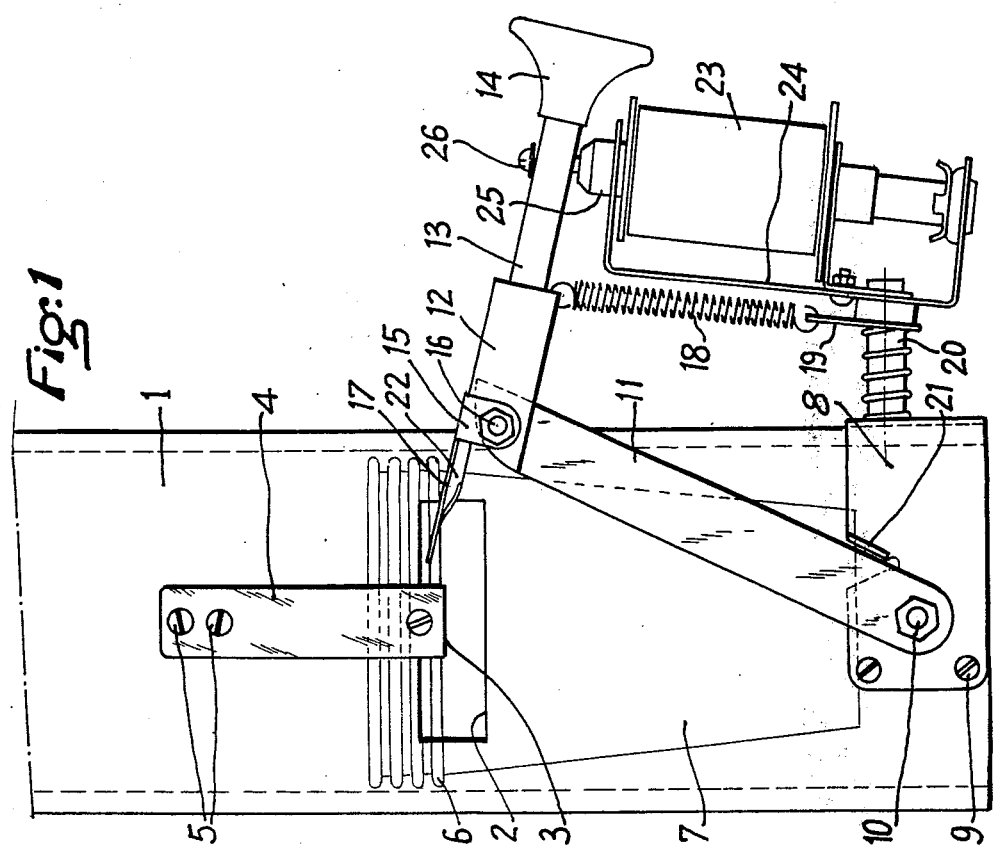

DISPENSER, NOTABLY FOR CONTAINERS

BACKGROUND OF THE INVENTION

1. Field of the Invention

This invention relates to apparatus adapted to be controlled manually or automatically for dispensing either separately or in a predetermined number articles taken from a stack thereof, for example from a stack of said articles kept in a suitable magazine. This invention is applicable more particularly to the dispensing of containers such as tumblers.

2. Description of the Prior Art

Tumbler dispensing apparatus, adapted to release separately tumblers stacked within the apparatus, are already known. In these apparatus, the stacked tumblers are supported in the inoperative condition of the apparatus by causing the peripheral bead or flange of the lowermost tumbler in the stack to bear on the inner, in-turned edge of a pair of hinged arms, and the tumbler to be dispensed is released by causing lateral blades to perform a movement of translation until they constitute a proper support for the peripheral bead of the second tumbler from the bottom of the stack, whereafter the hinged arms are moved away from each other in the plane of the apparatus for releasing the lowermost tumbler and allow same to fall freely through a suitable outlet aperture. In apparatus of this character, which comprise a relatively great number of movable component elements, the construction is relatively complicated, thus increasing the manufacturing cost and leading to frequent hold ups especially when these apparatus are operated carelessly.

SUMMARY OF THE INVENTION

It is the primary object of the present invention to avoid the inconveniences of hitherto known apparatus of this kind by providing an apparatus for dispensing tumblers and like containers which is constructionally simple, sturdy and economical, and so designed that in actual operation it comprises only one movable member.

According to this invention, the apparatus for dispensing containers one by one or in series each comprising a predetermined number of such containers, for example tumblers, comprises in a tubular hollow magazine a stack of interfitting tumblers or like articles held in position by causing the outer peripheral wall of the lowermost tumbler in the stack to bear with two diametrally opposed portions against a pair of clamp-forming members carried by the free ends of spring blades secured at their other ends to the wall of said magazine, a control member pivoted to the wall of said magazine and having two opposite portions in the form of horizontal plates adapted to co-act with clamp-forming members for moving said clamp-forming members from the position in which they clamp and hold the lowermost article of the stack to a position in which they move away from each other to free said lowermost article, means operatively connected to said pivoting control member for automatically holding in said magazine the stacked articles overlying said lowermost article during the release thereof, when said clamp-forming members are opened.

According to a first form of embodiment of the invention which is particularly advantageous for handling and dispensing tumblers having a projecting peripheral bead or flange, the clamp-forming members consist of the bent, in-turned free ends of said spring blades, said bent free ends being adapted to support two opposite positions of the peripheral bead or flange of the lowermost tumbler or like article in the stack. The plate-shaped portions of said pivoting control member are adapted, through an aperture formed in the outer wall of said magazine, to be inserted between the stacked tumblers to be dispensed and the relevant spring blade in order to move said blades apart and thus release the lowermost tumbler or like article. In order to hold the remaining tumblers or like articles of the stack during the release of the lowermost tumbler, said plate-shaped portions have an inner edge adapted to be inserted between the peripheral beads or flanges of the first two tumblers of the stack from the bottom thereof, for supporting the next tumbler following the lowermost tumbler.

The plate-shaped portions of said pivoting control member are each advantageously provided with an oblique outer edge in order to move the retaining clamps gradually away from each other and thus prevent the lowermost container from being released completely until the next overlying tumbler in the stack is supported by the lower edges of said plate-shaped portions. Moreover, the inner edge of said horizontal plate-shaped portions may comprise a vertical extension, preferably tapering in the foreard direction, adapted during the forward movement of the pivoting control member to be inserted between the outer peripheral edge of the lowermost tumbler and the corresponding edge of the next tumbler in the stack, so as to exert a downward thrust against the lowermost tumbler and thus assist in causing the fall thereof by gravity.

According to another typical form of embodiment of this invention, which is particularly useful when the articles to be dispensed do not comprise a projecting peripheral bead or flange, the apparatus according to the present invention comprises, in addition to the pair of clamps adapted to hold the last article of the stack, which consist of a pair of bow-shaped or arcuate elements carried by the free ends of a first pair of spring blades, another pair of clamps disposed at a higher level and consisting likewise of a pair of bow-shaped or arcuate elements carried by another pair of spring blades extending parallel to said pair of spring blades. Each plate-shaped member of the pivoting control member comprises in this case a pair of parallel fingers having each an integral projection adapted to co-act with a first spring blade or a second spring blade, the positions of said projections on said fingers being offset therealong so that during the movement of the pivoting control member to its operative position they engage in succession the spring blades associated therewith in order to control the clamping movement of the upper clamps before opening the lower clamps, so that only the lowermost article of the stack is released.

BRIEF DESCRIPTION OF THE DRAWINGS

FIG. 1 is a side elevational view of a first form of embodiment of an apparatus according to this invention for dispensing tumblers, the apparatus being shown in its inoperative condition, FIG. 2 is a front view of the apparatus shown in FIG. 1, but in its operative condition;

DESCRIPTION OF THE PREFERRED EMBODIMENTS

Figure 4:
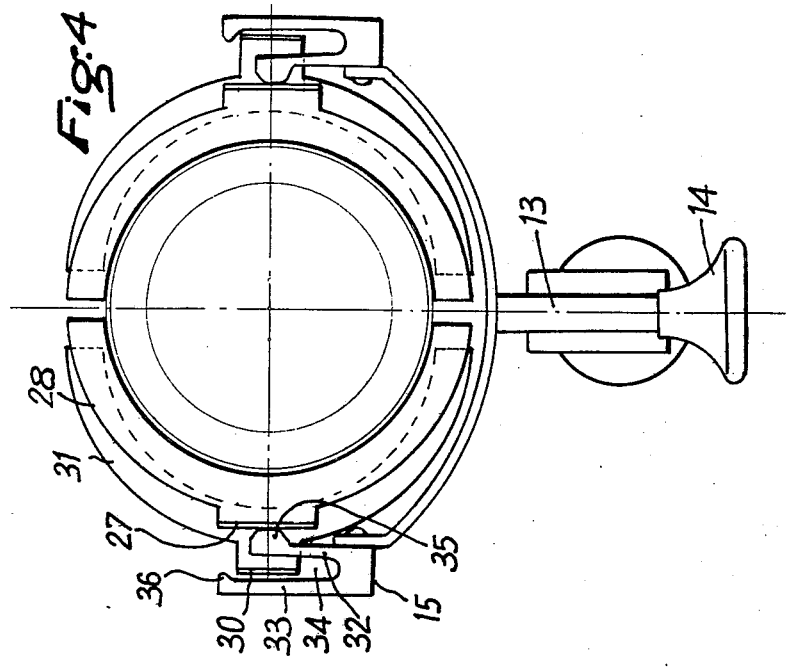
FIG. 4 is a cross-section taken along the line VI—VI of FIG. 3.

Referring first to FIGS. 1 and 2 of the drawings, the reference numeral 1 designates the magazine of the apparatus, consisting of a cylindrical hollow receptacle open at its upper end to permit the refilling of the apparatus and at its lower end to permit the delivery of individual tumblers, for example by means of a spout (not shown). The wall of this magazine 1 made of glass, plastic or any other material, preferably transparent at least along one fraction of its height, has formed in its lower portion a pair of opposite transverse apertures 2 each adapted to be engaged by the bent, in-turned end 3 of a spring blade 4 directed parallel to the axis of said magazine 1 and secured to the outer surface of the magazine by means of screws 5. In the inoperative position the bent ends 3 of said blades 4 engage the outer peripheral edge or bead 6 of a tumbler 7 introduced into the magazine 1 or of the lowermost tumbler 7 of a plurality of stacked or interfitting tumblers contained in said magazine 1, so as to hold the tumbler or the stacked tumblers 7 in a suspended condition therein.

The inner wall of magazine 1 has its lower end rigidly assembled by means of screws 9 to an arcruate plate 8 carrying at its ends diametrally opposite radial pivot pins 10 aligned with the vertical median line of spring blades 4 for pivoting the lower ends of a pair of parallel arms 11 braced with each other at their upper ends by a curved plate 12 carrying intermediate its ends a rod 13 extending in a direction opposite to said magazine 1 and carrying at its outer end a control knob 14. Each arm 11 has its upper end rigid with an angle member 15 having a vertical wing secured to said arm 11 by means of a bolt 16 and a horizontal wing 17 adapted, when said arm 11 is rotated about the pivot pin 10, to bring same to a position parallel to the axis of said magazine 1 and thus engage the registering aperture 2 formed in the wall of said magazine. The width of the horizontal wing of each angle member 15 decreases from its outer edge to its inner edge so that this width is greater at its end adjacent the arm 11 in comparison with the opposite end. Thus, is is clear that the arms 11 are pivoted about the pivot pins 10 as a consequence of a thrust exerted on the knob 14 in the direction of the magazine 1, the horizontal wing 17 engaged with its narrowest end the inner face of the relevant spring blade 4, thus pushing this blade gradually outwards and releasing the edge or bead 6 of the lowermost tumbler 7, whereby this tumbler will fall by gravity through the bottom aperture of said magazine 1. At the same time, the inner edge of the horizontal wing 17 is caused to engage the bead or flange 6 of the next tumbler 7 from underneath, so as to hold in position the stacked tumblers 7 within the magazine 1.

In the plane of said rod 13 the curved plate 12 has attached thereto one end of a traction spring 18 having its other end anchored to a fastening plate 19 co-acting with a radial rod 20 carried by the arcuate plate 8. With this construction, when the apparatus is in its inoperative condition, as shown in FIG. 1, the arms 11 engage abutment ears 21 formed on said arcuate plate 8 and the spring 18 is unstressed. When the control knob 14 is pushed to operate the apparatus, the spring 18 is tensioned to provide a force capable of returning the complete apparatus to its inoperative position.

Now the Applicant actually found that under certain conditions the lowermost tumbler 7 released by the spring blades 4 fails to drop by gravity and thus remain stuck to the next tumbler in the stack. Therefore, in the above-described form of embodiment of the present invention it is contemplated to provide on the inner edge of the above-defined horizontal wing 17 of each member 15 a vertical extension 22 having a height increasing from the end of wing 17 remotest from the arm 11 to its opposite end. Under these conditions, it is clear that when actuating the apparatus while the wing 17 causes the in-turned ends 3 of spring blades 4 to move away from each other the vertical extension 22 will be inserted between the edges or beads 6 of the first and second tumblers 7 from the bottom of the stack, and due to the gradually increasing height of this extension 22 it will exert on the edge or bead 6 of the lowermost tumbler a downward force assisting, if necessary, in separating this lowermost tumbler from the next overlying tumbler in the stack.

The movement of the pivoting arms 11 carrying said angle members 15 may be obtained by the user pushing the control knob 14 manually, but it is obvious that this movement could be obtained through any known and suitable automatic control means capable of exerting a suitable thrust to the arms 11. Thus, a typical automatic control means may comprise for example, as shown in the drawings, by an electromagnet having its coil 23 mounted by means of a fixed bracket 24 to the rod 20 and its movable plunger coil 25 secured to the rod 13 by means of a screw 26.

It will be seen that the apparatus according to the present invention can easily be adjusted for dispensing tumblers of different diameters. To this end, it is only necessary to adjust the relative spacing of members 15 on arms 11, for example by using relatively thin shims (not shown in the drawings). In this case it is also required to adjust the relative spacing of spring blades 4, for example by using a device mounted on the magazine by means of a screw and comprising two fingers each adapted to be engaged between the wall of magazine 1 and a spring blade 4, the arrangement being such that the degree of sinking of these fingers and therefore the desired relative spacing of spring blades 4 are obtained by turning the screw in one or the other direction.

Figure 3:
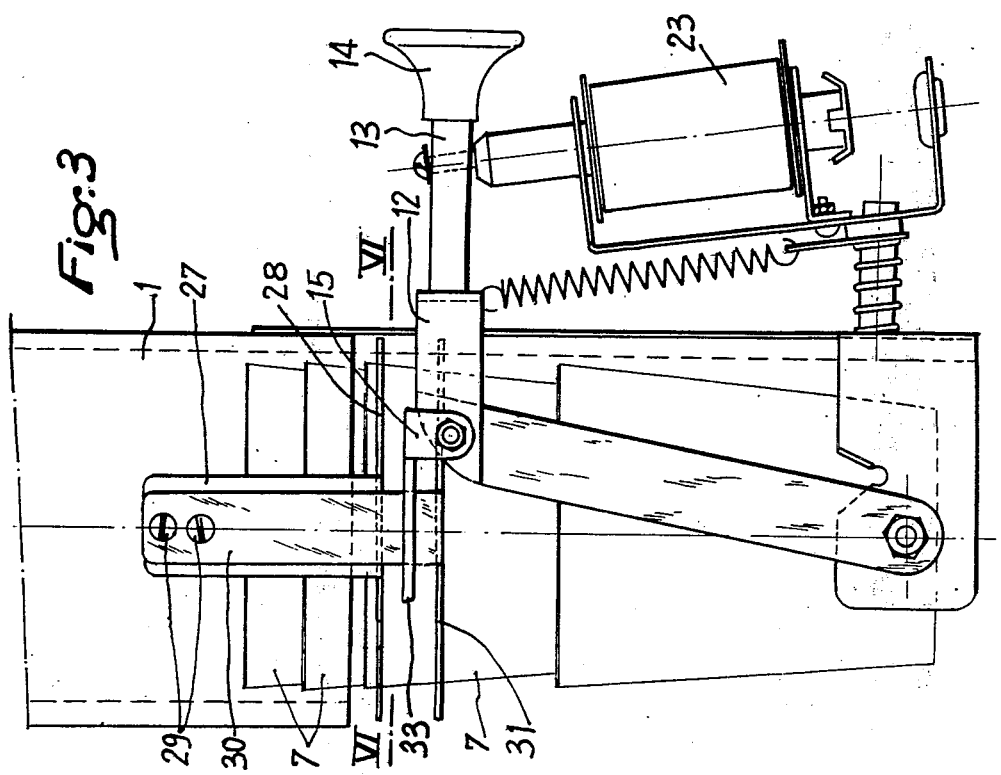
FIG. 3 is a side elevational view showing a modified form of embodiment of the apparatus of this invention, also in its tumbler-dispensing condition

FIGS. 3 and 4 of the drawings illustrate diagrammatically a modified form of embodiment of the apparatus according to this invention for dispensing tumblers and like articles free of projecting beads or flanges. At the lower portion of the magazine 1 and at diametrally opposite locations a pair of spring blades 27 are secured by means of screws 29, each blade carrying at its lower end a curved rod 28 adapted to engage one portion of the outer peripheral surface of a tumbler 7. Parallel to these spring blades 27 but externally thereto in relation to the outer wall of magazine 1 another set of spring blades 30 are secured by the same screws 29, and the lower ends of these additional spring blades 30 carry likewise arcuate supporting members 31 disposed at a level somewhat lower than that of said curved rods 28. The members 15 carried by the upper end of each arm 11 of the pivoting control member comprises on its horizontal wing a pair of parallel fingers 32, 33 between which a relatively deep notch 34 is formed. The fingers 32, 33 are so arranged that when the pivoting control member 13, 14 is actuated the finger 32 engages the gap left between the spring blades 27 and 30 while finger 33 extends externally of spring blade 30. Each finger 32, 33 has formed at its outer or free end an inner projection 35, 36, respectively, and finger 32 is shorter than finger 33 so that, according to the momentary position of control member 13, 14 either of said fingers 32 or 33 will actuate the corresponding spring blade and the clamp associated therewith.

The mode of operation of this modified structure of the apparatus according to the present invention is readily apparent. In the inoperative position of the apparatus (not shown) the control rod 13 is in its retracted position with the fingers 33 acting through their projections 36 on the spring blades 30 for clamping between the clamps 31 the lowermost tumbler 7 of the stacked or interfitting tumblers filling the magazine 1, while the end projections 35 of fingers 32 disposed behind the spring blades 27 do not engage these blades 27 so as to leave the upper clamp 28 in its inoperative position. When actuating the rod 13 by means of the electromagnet 23, the projection 36 will slide transversely on spring blade 30 while holding the lower clamps 31 closed or operative and, at the same time, the projection 35 of finger 32 will engage the spring blade 27 to close the upper clamps 28 on the first tumbler 7 of the stack which must not be released. At the end of the operative stroke of rod 13 (FIGS. 3 and 4) the projection 36 of finger 33 releases the spring blade 30, thus opening the lower clamps 31 and releasing the lower tumbler or tumblers to be dispensed, the other stacked tumblers remaining in position due to the closed upper clamps 28. The return stroke of rod 13 to its inoperative position will firstly close the lower clamps 31, then open the upper clamps 28, thus transferring to said lower clamps the function of holding or retaining the stacked tumblers within the magazine 1.

It will readily occur to those conversant with the art that the two exemplary forms of embodiment of the apparatus of this invention shown and described herein are given by way of illustration, not of limitation, and that many modifications and variations may be brought thereto without departing from the scope of the invention as set forth in the appended claims.

What is claimed is:

1. Apparatus for the controlled dispensing of articles comprising a magazine, for a stack of said articles, having opposite side openings, a pair of first spring blades connected to said magazine and each having a portion extending through one of said side openings and positioned for retaining a peripheral edge of the lowermost article of said stack, a pair of second spring blades each connected to said magazine above said first spring blades and positioned through another of said side openings for engaging the stacked article just above the lowermost article to be released, a pair of supporting arms, each pivotally connected at one end portion to said magazine, plate-shaped members each being connected to the other end portion of said arms, a connecting member being connected to said arm other end portions, a control rod being attached to said connecting member, said plate-shaped members each comprising a pair of parallel fingers extending across a pair of said first and second spring blades with each finger having a side projection, said projections being off-set in relation to each other, whereby according to the movement of said control rod only one of said projections co-acts with its related spring blade at a time so that in an inoperative position of said control rod said first spring blades are clamped on the lowermost article of the stack while said second spring blades do not engage the stack and by a movement of said control rod to an operative position, against the action of spring means, said second spring blades are clamped on the article in the stack just above the lowermost article while said first spring blades free said lowermost article.

2. Apparatus for the controlled dispensing of articles as claimed in claim 1 including an electromagnet having a coil secured to said magazine and a plunger core operatively connected to said control rod and means for supplying current to said core for moving said control rod and thus said arms to said operative position.

3. Apparatus for the controlled dispensing of articles as claimed in claim 1 including means for adjusting the relative spacing of said plate-shaped portions and each of said first and second spring blades in relation to said magazine to adjust to different diameters of the articles to be dispensed.

* * * * *